US012780967B2

(12) United States Patent
Storz et al.

(10) Patent No.: US 12,780,967 B2
(45) Date of Patent: Nov. 3, 2026

(54) LOW DIELECTRIC RESIN COMPOSITION AND AN ARTICLE OF MANUFACTURE PREPARED THEREFROM

(71) Applicant: Huntsman Advanced Materials Licensing (Switzerland) GmbH, Basel (CH)

(72) Inventors: Christof Storz, Basel (CH); Kenneth Black Scobbie, Basel (CH); Susanne Elmer, Basel (CH); Michael Yin Wong, Basel (CH); Alessandro Napoli, Basel (CH)

(73) Assignee: HUNTSMAN ADVANCED MATERIALS (Switzerland) GmbH, Basel (CH)

( * ) Notice: Subject to any disclaimer, the term of this patent is extended or adjusted under 35 U.S.C. 154(b) by 545 days.

(21) Appl. No.: 18/283,831

(22) PCT Filed: Mar. 30, 2022

(86) PCT No.: PCT/EP2022/058474

§ 371 (c)(1),
(2) Date: Sep. 25, 2023

(87) PCT Pub. No.: WO2022/207741

PCT Pub. Date: Oct. 6, 2022

(65) Prior Publication Data

US 2024/0182613 A1 Jun. 6, 2024

(30) Foreign Application Priority Data

Mar. 31, 2021 (EP) .................................... 21166228

(51) Int. Cl.

*C08F 212/32* (2006.01)
*C08F 283/06* (2006.01)
*C08J 5/24* (2006.01)
*C08L 71/12* (2006.01)

(52) U.S. Cl.

CPC .......... *C08F 212/32* (2013.01); *C08F 283/06* (2013.01); *C08J 5/249* (2021.05); *C08L 71/126* (2013.01); *C08J 2471/12* (2013.01)

(58) Field of Classification Search

None

See application file for complete search history.

(56) References Cited

U.S. PATENT DOCUMENTS

| | | | |
|---|---|---|---|
| 2005/0176909 A1 | 8/2005 | Nishiguchi et al. | |
| 2008/0004367 A1 | 1/2008 | Takada et al. | |
| 2019/0127505 A1* | 5/2019 | Hayes | C08F 212/08 |
| 2019/0127506 A1 | 5/2019 | Hayes et al. | |
| 2022/0243013 A1 | 8/2022 | Umehara et al. | |

FOREIGN PATENT DOCUMENTS

| | | |
|---|---|---|
| JP | 2003277440 A | 10/2003 |
| JP | 2003283076 A * | 10/2003 |
| JP | 2006063230 A | 3/2006 |
| JP | 2007112826 A | 5/2007 |
| TW | 200628536 A | 8/2006 |
| TW | 201922820 A | 6/2019 |
| WO | 2006059750 A1 | 6/2008 |
| WO | 2020203320 A1 | 10/2020 |

OTHER PUBLICATIONS

Taiwan office action issued Aug. 20, 2025 in corresponding TW application No. 111112508 (tmachine translation included).
International Search Report and Written Opinion of PCT Application No. PCT/EP2022/058474 filed Mar. 30, 2022.
Japanese office action issued Feb. 25, 2026 in corresponding JP application No. 2023-558748 (machine translation included).

* cited by examiner

*Primary Examiner* — Richard A. Huhn
(74) *Attorney, Agent, or Firm* — HUNTSMAN ADVANCED MATERIALS (Switzerland) GmbH

(57) ABSTRACT

The present disclosure generally relates to a resin composition having a low dielectric constant (Dk) and a low dielectric dissipation factor (Df) including a crosslinker selected from a vinylbenzyl indene compound, a vinylbenzyl fluorene compound and a mixture thereof and a resin selected from a polyphenylene ether derivative, a hydrocarbon thermoplastic and a compound containing one or more maleimide groups.

15 Claims, No Drawings

LOW DIELECTRIC RESIN COMPOSITION AND AN ARTICLE OF MANUFACTURE PREPARED THEREFROM

CROSS-REFERENCE TO RELATED APPLICATIONS

This application is a national phase of International Application No. PCT/EP2022058474 filed Mar. 30, 2022, which designates the U.S and claims priority to EP Application Serial No. 21166228.3 filed on Mar. 31, 2021. The noted applications are incorporated herein by reference.

FIELD

The present disclosure relates to vinylbenzyl-based resin compositions and to their uses in various applications, such as, in the production of a prepreg, a laminated board for printed wiring board, a molding material and an adhesive.

BACKGROUND

With the development of wireless network and satellite communications, electronic products are trending toward the need for higher speed, frequency and larger capacity for the transmission of voice, video and data. In addition, as these electronic products become thinner and smaller, electrical circuit boards tend to increase in complexity, density and multi-layer stratification. In order to maintain the high rate of transmission and signal integrity, printed circuit boards ("PCB") have a need for materials with a low dielectric constant ($D_k$) and low dielectric loss (sometimes also called loss factor or dissipation factor, $D_f$) thereby resulting in lower signal loss.

Polymer insulating materials are usually used as substrate materials for PCB's. The laminate for the PCB is either made of the polymer insulating material alone or by blending the polymer insulating material with glass, fiber, nonwoven fabric, inorganic filler or the like. Epoxy resins have traditionally been employed due to their low cost and high heat and chemical resistant properties when cured. However, because of their relatively high dielectric constant and high dielectric loss tangent, it is difficult to achieve a suitable low dissipation factor at high frequency signals. Polyphenylene ether (PPO) resins have also been used in laminates due to their lower dielectric constants and dissipation properties, but the use of high frequency signals in new electronic fields require even lower dielectric loss constants and dissipation factors. Fluoro resins, typically represented by polytetrafluoroethylene (PTFE), have low dielectric constants and dissipation factors, but they are thermoplastic resins and therefore undergo large expansion and shrinkage during molding and processing and are materials that are not easily handled.

JP 2003/283076 describes a composition comprising the combination of a phenylmaleimide with a mixture of vinyl and allyl fluorene and such composition is used to manufacture prepreg having dielectric properties, particularly low dielectric loss tangent, and a heat resistance in a high frequency region. However, the use of a mixture comprising vinyl and allyl fluorene provide a low glass transition temperature to the composition due to the presence of allyl fluorene.

Accordingly, a need exists for the development of improved polymer insulating materials having sufficient thermomechanical properties, humidity resistance, low dielectric characteristics and are easily processable to cope with the ever increasing high frequency signal transmissions.

SUMMARY

The present disclosure is generally directed to a resin composition including (a) a crosslinker selected from a vinylbenzyl fluorene, a vinylbenzyl indene and a mixture thereof and (b) a resin selected from a polyphenylene ether derivative, a hydrocarbon thermoplastic, a compound containing one or more maleimide groups and a mixture thereof.

Other embodiments of the present disclosure include a cured resin, a sheet-like cured resin, a laminated body, a prepreg, electronic parts, and single and multilayer circuit boards comprising the novel resin compositions of the present disclosure.

DETAILED DESCRIPTION

The present disclosure is generally directed to a resin composition having a low dielectric constant (Dk), a low dielectric dissipation factor (Df) and excellent thermomechanical properties, such as high thermal stability, good processability, high peel strength, good moisture resistance and/or a high glass transition temperature (Tg). In attempting to achieve the objects of the present disclosure, it was surprisingly discovered that when a resin composition is made with the above-described crosslinker(s) in combination with the above described resins, a significant reduction in Df can be achieved as compared to a resin composition containing state of the art resins. The novel resin composition as a whole exhibits a low Dk and low Df in the gigahertz range (e.g., 1-10 GHz) allowing it to meet the rigorous required industrial standards in a variety of applications, such as prepregs, metal clad laminates, printed circuit boards, light emitting diodes and electronic coatings. The novel resin composition may also find use in textiles, polymer molding compounds, and medical molding compounds.

The following terms shall have the following meanings:

The term "comprising" and derivatives thereof are not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, except those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or to more than one (i.e. to at least one) of the grammatical objects of the article. By way of example, "a crosslinker" means one crosslinker or more than one crosslinker. The phrases "in one embodiment", "according to one embodiment" and the like generally mean the particular feature, structure, or characteristic following the phrase is included in at least one embodiment of the present disclosure and may be included in more than one embodiment of the present disclosure. Importantly, such phrases do not necessarily refer to the same aspect. If the specification states a component or feature "may", "can", "could", or "might" be included or have a characteristic, that particular component or feature is not required to be included or have the characteristic.

The term "about" as used herein can allow for a degree of variability in a value or range, for example, it may be within 10%, within 5%, or within 1% of a stated value or of a stated limit of a range.

Values expressed in a range format should be interpreted in a flexible manner to include not only the numerical values explicitly recited as the limits of the range, but to also include all of the individual numerical values or sub-ranges encompassed within that range as if each numerical value and sub-range is explicitly recited. For example, a range such as from 1 to 6, should be considered to have specifically disclosed sub-ranges, such as, from 1 to 3, from 2 to 4, from 3 to 6, etc., as well as individual numbers within that range, for example, 1, 2, 3, 4, 5, and 6. This applies regardless of the breadth of the range.

The terms "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the present disclosure.

The term "in the range" or "within a range" (and similar statements) includes the endpoints of the stated range.

Where substituent groups are specified by their conventional chemical formula, written from left to right, they equally encompass the chemically identical substituents that would result from writing the structure from right to left, for example, $—CH_2O—$ is equivalent to $—OCH_2—$.

The term "optional" or "optionally" means that the subsequently described event or circumstance may or may not occur, and that the description includes instances where said event or circumstance occurs and instances where it does not.

The term "alkyl" refers to a linear or branched hydrocarbyl radical having 1 to 20 carbon atoms, and "substituted alkyl" refers to an alkyl further bearing one or more substituents selected from hydroxy, alkoxy, mercapto, cycloalkyl, heterocyclic, aryl, heteroaryl, aryloxy, halogen, trifluoromethyl, cyano, nitro, nitrone, amino, amido, C(O)H, acyl, oxyacyl, carboxyl, carbamate, sulfonyl, sulfonamide, and sulfuryl.

The term "lower alkyl" refers to a linear or branched hydrocarbyl radical having 1 to 6 carbon atoms, preferably 1 to 4 carbon atoms and "substituted lower alkyl" refers to a lower alkyl further bearing one or more substituents selected from hydroxy, alkoxy, mercapto, cycloalkyl, heterocyclic, aryl, heteroaryl, aryloxy, halogen, trifluoromethyl, cyano, nitro, nitrone, amino, amido, C(O)H, acyl, oxyacyl, carboxyl, carbamate, sulfonyl, sulfonamide, and sulfuryl.

The term "alkenyl" refers to a linear or branched hydrocarbyl radical having 2 to 20 carbon atoms and at least one carbon-carbon double bond.

The term "alkynl" refers to a linear or branched hydrocarbyl radical having 2 to 20 carbon atoms and at least one carbon-carbon triple bond.

The terms "alkylcarbonyl", "alkenylcarbonyl" and "alkynylcarbonyl" refer to an alkyl group, alkenyl group or alkynyl group as defined above, which is bonded via the carbon atom of a carbonyl group (C═O) to the remainder of the molecule.

The term "cycloalkyl" refers to a divalent cyclic ring-containing group containing in the range of 3 to 8 carbon atoms, and "substituted cycloalkyl" refers to a cycloalkyl further bearing one or more substituents selected from hydroxy, alkoxy, mercapto, cycloalkyl, heterocyclic, aryl, heteroaryl, aryloxy, halogen, trifluoromethyl, cyano, nitro, nitrone, amino, amido, C(O)H, acyl, oxyacyl, carboxyl, carbamate, sulfonyl, sulfonamide, and sulfuryl.

The term "aryl" refers to a divalent aromatic group having 6 to 14 carbon atoms and "substituted aryl" refers to an aryl further bearing one or more substituents selected from hydroxy, alkoxy, mercapto, cycloalkyl, heterocyclic, aryl, heteroaryl, aryloxy, halogen, trifluoromethyl, cyano, nitro, nitrone, amino, amido, C(O)H, acyl, oxyacyl, carboxyl, carbamate, sulfonyl, sulfonamide, and sulfuryl.

The term "polyaryl" refers to a divalent moiety comprising a plurality (i.e., at least two, up to about 10) divalent aromatic groups (each having 6 to 14 carbon atoms), wherein said divalent aromatic groups are linked to one another directly, or via a 1-3 atom linker; and "substituted polyaryl" refers to polyaryl further bearing further bearing one or more substituents selected from hydroxy, alkoxy, mercapto, cycloalkyl, heterocyclic, aryl, heteroaryl, aryloxy, halogen, trifluoromethyl, cyano, nitro, nitrone, amino, amido, C(O)H, acyl, oxyacyl, carboxyl, carbamate, sulfonyl, sulfonamide, and sulfuryl.

The term "heteroaryl' refers to a divalent aromatic group containing one or more heteroatoms (e.g., N, O, S, or the like) as part of the ring structure, and having in the range of 3 or 14 carbon atoms; and "substituted aryl" refers to arylene groups further bearing one or more substituents selected from hydroxy, alkoxy, mercapto, cycloalkyl, heterocyclic, aryl, heteroaryl, aryloxy, halogen, trifluoromethyl, cyano, nitro, nitrone, amino, amido, C(O)H, acyl, oxyacyl, carboxyl, carbamate, sulfonyl, sulfonamide, and sulfuryl.

The term "polyheteroaryl" refers to a divalent moiety comprising a plurality (i.e., at least two, up to about 10) heteroaryl groups (each containing at least one heteroatom, and in the range of 3 up to 14 carbon atoms), wherein the heteroarylene groups are linked to one another directly, or via a 1-3 atom linker; and "substituted polyheteroarylene" refers to a polyheteroaryl further bearing one or more substituents selected from hydroxy, alkoxy, mercapto, cycloalkyl, heterocyclic, aryl, heteroaryl, aryloxy, halogen, trifluoromethyl, cyano, nitro, nitrone, amino, amido, C(O)H, acyl, oxyacyl, carboxyl, carbamate, sulfonyl, sulfonamide, and sulfuryl.

The terms "dielectric dissipation factor (Df)" and "loss tangent," as used herein, are synonymous and refer to the amount of energy dissipated (i.e., electrical loss) into an insulating material when a voltage is applied to the circuit. Df represents the loss of the signal in the circuit.

The terms "dielectric constant (Dk)" and "permittivity," as used herein, are synonymous and refer to a measurement of the relative capacitance of an insulating material to that of air or vacuum. The dielectric constant determines the speed of the electronic signal.

The term "peel strength" refers to the force required to separate the ultra-thin metal (e.g. copper) foil from a substrate to which it has been laminated.

The term glass transition temperature" or "$T_g$," as used herein, means the temperature at which the amorphous domains of a polymer take on the characteristic properties of the glass state-brittleness, stiffness, and rigidity. The term further means the temperature at which cured resins undergo a change from a glassy state to a softer more rubbery state.

According to one embodiment, the present disclosure is directed to a resin composition including: (a) a crosslinker selected from: (i) a vinylbenzyl indene having a formula (1)

(1)

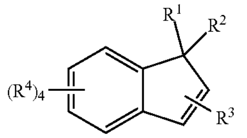

where $R^1$, $R^2$ and $R^3$ are each independently selected from a vinylbenzyl group, a hydrogen atom, a lower alkyl group, a thioalkoxy group having 1 to 5 carbon atoms, and an aryl group provided that at least one of $R^1$, $R^2$, and $R^3$ is a vinylbenzyl group; and $R^4$ is selected from a hydrogen atom, a halogen atom, a lower alkyl group, an alkoxy group having 1 to 5 carbon atoms, a thioalkoxy group having 1 to 5 carbon atoms, a thioaryloxy group, and an aryl group; (ii) a vinylbenzyl fluorene having a formula (2)

(2)

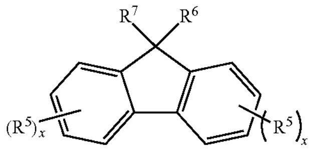

where each $R^5$ is independently selected from a hydrogen atom, a halogen atom, a lower alkyl group, an alkoxy group having 1 to 5 carbon atoms, a thioalkoxy group having 1 to 5 carbon atoms, and an aryl group, x is an integer of 0 to 4; and $R^6$ and $R^7$ are independently selected from a vinylbenzyl group, a hydrogen atom, a lower alkyl group, a thioalkoxy group having 1 to 5 carbon atoms, and an aryl group provided that at least one of $R^6$ and $R^7$ is a vinylbenzyl group; and, (iii) a mixture thereof; and (b) a resin selected from: (i) a polyphenylene ether derivative; (ii) a hydrocarbon thermoplastic; (iii) a compound having a formula (3)

(3)

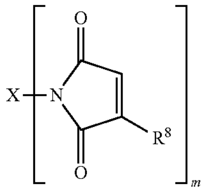

where X is an alkyl group, a substituted alkyl group, a cycloalkyl group, a substituted cycloalkyl group, an aryl group, a substituted aryl group, a polyaryl group, a substituted polyaryl group, a heteroaryl group, a substituted heteroaryl group, a polyheteroaryl group and a substituted polyheteroaryl group, $R^8$ is hydrogen, a lower alkyl group or a substituted lower alkyl group and m is an integer from 1 to 10; and (iv) a mixture thereof.

According to one embodiment, the vinylbenzyl indene having the formula (1) includes compounds where $R^1$, $R^2$ and $R^3$ are independently selected from hydrogen and a vinylbenzyl group, provided that at least one of $R^1$, $R^2$ and $R^3$ is a vinylbenzyl group and $R^4$ is selected from a hydrogen atom, a halogen atom, and a lower alkyl group. In still another embodiment, the vinylbenzyl indene having the formula (1) includes compounds where $R^1$, $R^2$ and $R^3$ are independently selected from hydrogen and a vinylbenzyl group provided that at least one of $R^1$, $R^2$ and $R^3$ is a vinylbenzyl group and $R^4$ is hydrogen. In yet another embodiment, the vinylbenzyl indene having the formula (1) includes compounds where $R^1$ and $R^2$ are a vinylbenzyl group and $R^3$ is hydrogen or a vinylbenzyl group and $R^4$ is hydrogen. In yet another embodiment, the vinylbenzyl indene is selected from 1,1,3-(2-vinylbenzyl)-1H-indene, 1,1,2-(3-vinylbenzyl)-1H-indene, 1,1,2-(4-vinylbenzyl)-1H-indene, 1,1-(2-vinylbenzyl)-1H-indene, 1,1-(3-vinylbenzyl)-1H-indene, 1,1-(4-vinylbenzyl)-1H-indene, 1,3-(2-vinylbenzyl)-1H-indene; 1,3-(3-vinylbenzyl)-1H-indene; 1,3-(4-vinylbenzyl)-1H-indene; 1-(2-vinylbenzyl)-1H-indene; 1-(3-vinylbenzyl)-1H-indene; 1-(4-vinylbenzyl)-1H-indene; 3-(2-vinylbenzyl)-1H-indene; 3-(3-vinylbenzyl)-1H-indene; 3-(4-vinylbenzyl)-1H-indene and a mixture thereof.

In still another embodiment, the vinylbenzyl indene having the formula (1) includes compounds where $R^1$, $R^2$ and $R^3$ are vinylbenzyl groups and $R^4$ is hydrogen. Such embodiments include the vinylbenzyl indenes alone or in a mixture thereof. In one embodiment, the mixture includes from about 50% by weight to about 85% by weight of 1,1,2-(4-vinylbenzyl)-1H-indene, from about 10% by weight to about 50% by weight of 1,1,2-(3-vinylbenzyl)-1H-indene and from 0% by weight to about 10% by weight of 1,1,3-(2-vinylbenzyl)-1H-indene, where the % by weight is based on the total weight of the mixture.

In another embodiment, the vinylbenzyl fluorene having the formula (2) includes compounds where each $R^5$ is independently selected from a hydrogen atom, a halogen atom and a lower alkyl group and $R^6$ and $R^7$ are independently selected from a vinylbenzyl group, a hydrogen atom and a lower alkyl group provided that at least one of $R^6$ and $R^7$ is a vinylbenzyl group. In still another embodiment, the vinylbenzyl fluorene having the formula (2) includes compounds where each $R^5$ is a hydrogen atom and $R^6$ and $R^7$ are independently selected from a vinylbenzyl group and a hydrogen atom. In still another embodiment, the vinylbenzyl fluorene having the formula (2) includes compounds where each $R^5$ is a hydrogen atom and $R^6$ and $R^7$ are a vinylbenzyl group. In yet another embodiment, the vinylbenzyl fluorene having the formula (2) is selected from 9,9-bis-(2-vinylbenzyl)-9H-fluorene, 9,9-bis-(3-vinylbenzyl)-9H-fluorene, 9,9-bis-(4-vinylbenzyl)-9H-fluorene and a mixture thereof.

According to another embodiment, the (a) crosslinker comprises (i) 0%-100% by weight of the vinylbenzyl indene having the formula (1) and (ii) 100%-0% by weight of the vinylbenzyl fluorene having the formula (2), where the % by weight is based on the total weight of the crosslinker. In still another embodiment, the (a) crosslinker comprises (i) 10%-90% by weight of the vinylbenzyl indene having the formula (1) and (ii) 90%-10% by weight of the vinylbenzyl fluorene having the formula (2), where the % by weight is based on the total weight of the crosslinker. In a further embodiment, the (a) crosslinker comprises (i) 20%-80% by weight, or 30%-70% by weight or 40%-60% by weight of the vinylbenzyl indene having the formula (1) and (ii) 80%-20% by weight or 70%-30% by weight or 60%-40% by weight of the vinylbenzyl fluorene having the formula (2), where the % by weight is based on the total weight of the crosslinker.

In one particular embodiment, the (a) crosslinker comprises (i) at least about 50% by weight or at least about 60% by weight or at least about 70% by weight or at least about 80% by weight of one or more of 1,1,3-(2-vinylbenzyl)-1H-indene, 1,1,2-(3-vinylbenzyl)-1H-indene, 1,1,2-(4-vinylbenzyl)-1H-indene and less than about 50% by weight or less than about 40% by weight or less than about 30% by weight or less than about 20% by weight of one or more of 1,1-(2-vinylbenzyl)-1H-indene, 1,1-(3-vinylbenzyl)-1H-indene, 1,1-(4-vinylbenzyl)-1H-indene, 1,3-(2-vinylbenzyl)-1H-indene; 1,3-(3-vinylbenzyl)-1H-indene; 1,3-(4-vinylbenzyl)-1H-indene and less than about 5% by weight or less than about 3% by weight or less than about 1% by weight or 0% by weight of one or more of 1-(2-vinylbenzyl)-1H-indene; 1-(3-vinylbenzyl)-1H-indene; 1-(4-vinylbenzyl)-1H-indene; 3-(2-vinylbenzyl)-1H-indene; 3-(3-vinylbenzyl)-1H-indene; 3-(4-vinylbenzyl)-1H-indene where the % by weight is based on the total weight of the (i) component and (ii) the vinylbenzyl fluorene having the formula (2) is selected from 9,9-bis-(2-vinylbenzyl)-9H-fluorene, 9,9-bis-(3-vinylbenzyl)-9H-fluorene, 9,9-bis-(4-vinylbenzyl)-9H-fluorene and a mixture thereof.

In one embodiment, the resin composition may include the (a) crosslinker in an amount of less than about 90% by weight or less than about 80% by weight or less than about 70% by weight or less than about 60% by weight, where the % by weight is based on the total weight of the resin composition. In another embodiment, the resin composition may include the (a) crosslinker in an amount of at least about 25% by weight or at least about 35% by weight or at least about 40% by weight or at least about 45% by weight, where the % by weight is based on the total weight of the resin composition. In yet another embodiment, the resin composition may include the (a) crosslinker in an amount within a range of about 30%-90% by weight or within a range of about 40%-85% by weight or within a range of about 45%-80% by weight based on the total weight of the resin composition.

According to another embodiment, the (b) resin includes a polyphenylene ether derivative. The polyphenylene ether derivative may be a compound having the formula (4) or formula (5)

(4)

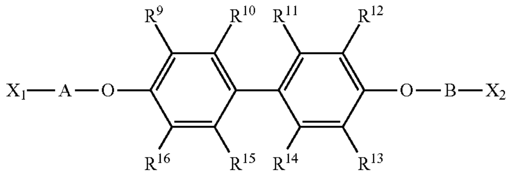

(5)

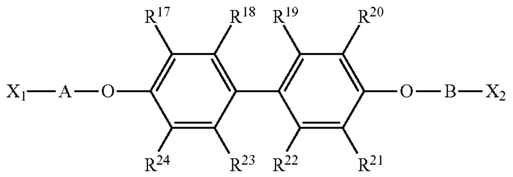

where $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$ and $R^{24}$ are each independently a hydrogen atom, an alkyl group, an alkenyl group, an alkynyl group, a formyl group, an alkylcarbonyl group, an alkenylcarbonyl group or an alkynylcarbonyl group, A and B are structures represented by the formula (6) and formula (7):

(6)

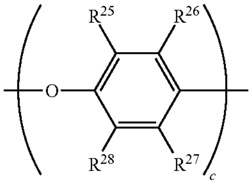

(7)

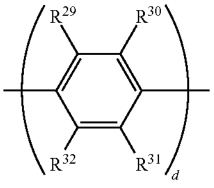

where $R^{25}$, $R^{26}$, $R^{27}$, $R^{28}$, $R^{29}$, $R^{30}$, $R^{31}$ and $R^{32}$ are each independently a hydrogen atom or an alkyl group and c and d are each an integer from 1 to 50 or from 1 to 20, Y is a hydrogen atom or alkyl group, and $X_1$ and $X_2$ are each independently a vinylbenzyl group or a structure represented by the following formula (8)

(8)

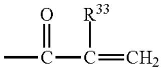

where $R^{33}$ is a hydrogen atom or an alkyl group.

In one embodiment, one or more of the $R^9$ to $R^{24}$ groups may be a hydrogen atom or an alkyl group having 1 to 18 carbon atoms or 1 to 10 carbon atoms. Specific examples include, but are not limited to, methyl, ethyl, propyl, hexyl and decyl groups. In another embodiment, one or more of the $R^9$ to $R^{24}$ groups may be an alkenyl group having 2 to 18 carbon atoms or 2 to 10 carbon atoms. Specific examples include, but are not limited to, a vinyl group, an allyl group or a 3-butenyl group. In yet another embodiment, one or more of the $R^9$ to $R^{24}$ groups may be an alkynyl group having 2 to 18 carbon atoms or 2 to 10 carbon atoms. Specific examples include, but are not limited to, an ethynyl group or a propargyl group.

In another embodiment, one or more of the $R^9$ to $R^{24}$ groups may be an alkylcarbonyl group having 2 to 18 carbon atoms or 2 to 10 carbon atoms. Specific examples include, but are not limited to, an acetyl group, a propionyl group, a butyryl group, an isobutyryl group, a pivaloyl group, a hexanoyl group and an octanoyl group. In another embodiment, one or more of the $R^9$ to $R^{24}$ groups may be an alkenylcarbonyl group having 3 to 18 carbon atoms or 3 to 10 carbon atoms. Specific examples include, but are not limited to, an acryloyl group, a methacryloyl group and a crotonoyl group. In yet another embodiment, one or more of the $R^9$ to $R^{24}$ groups may be an alkynylcarbonyl group having 3 to 18 carbon atoms or 3 to 10 carbon atoms. A specific example includes, but is not limited to, a propioloyl group.

In one embodiment, one or more of the $R^{25}$ to $R^{32}$ groups may be a hydrogen atom or an alkyl group having 1 to 18 carbon atoms or 1 to 10 carbon atoms. Specific examples include, but are not limited to, methyl, ethyl, propyl, hexyl and decyl groups.

In another embodiment, Y is a hydrogen atom or a methyl group, a methylmethylene group or a dimethylmethylene group.

In still another embodiment, the $X_1$ and $X_2$ groups may be a vinylbenzyl group (o-vinylbenzyl, m-vinylbenzyl or p-vinylbenzyl) or a structure according to formula (8) where $R^{33}$ is a hydrogen atom or a methyl group, an ethyl group, a propyl group, a hexyl group or a decyl group.

In one embodiment, the (b) resin may include the polyphenylene ether derivative in an amount within a range of 0% to about 100% by weight based on the total weight of the (b) resin. In another embodiment, the (b) resin may include the polyphenylene ether derivative in an amount within a range of about 10% to about 90% by weight or within a range of about 30% to about 70% by weight based on the total weight of the (b) resin.

According to another embodiment, the (b) resin includes a hydrocarbon thermoplastic. In one embodiment, the hydrocarbon thermoplastic is a styrene-based block copolymer. The styrene-based block copolymer may be a copolymer of styrene and an olefin (a conjugated diene such as butadiene or isoprene). Specific examples include, but are not limited to: a styrene-butadiene-styrene block copolymer (SBS), a styrene-isoprene-styrene block copolymer (SIS), a styrene-ethylene-butylene-styrene block copolymer (SEBS), a styrene-butadiene-butylene-styrene copolymer (SBBS), and hydrogenated materials of these; a styrene-ethylene-propylene-styrene block copolymer (SEPS); and, a styrene-ethylene-ethylene-propylene-styrene block copolymer (SEEPS). The content of the repeating unit derived from styrene in the styrene-based block copolymer may be in a range of about 10% by mass to about 90% by mass of all repeating units. In another embodiment, the content of the repeating units derived from styrene may be 40% by mass or more, or 45% by mass or more, and still more preferably 46% by mass or more of all repeating units while the upper limit may be, for example, 90% by mass or less or 85% by mass or less of all repeating units. In still another embodiment, the styrene-based block copolymer is a block copolymer with one terminal or both terminals having a styrene block, and particularly preferably a block copolymer whose both terminals have a styrene block. In the present application, the styrene-derived repeating unit is a constitutional unit derived from styrene, which is contained in the polymer upon polymerization of styrene or a styrene derivative and may have a substituent. Examples of the styrene derivative include α-methyl styrene, 3-methyl styrene, 4-propyl styrene, and 4-cyclohexyl styrene. Examples of the substituent include an alkyl group having 1 to 5 carbon atoms, an alkoxy group having 1 to 5 carbon atoms, an alkoxyalkyl group having 1 to 5 carbon atoms, an acetoxy group, and a carboxyl group.

Styrene-based block copolymers are commercially available, so these commercially available products can be used. Examples of non-hydrogenated products include the D Series copolymers, manufactured by Kraton Corporation, TRSeries copolymers, manufactured by JSRCorp., and TUFPRENE™ and ASAPRENE™" copolymers manufactured by Asahi Kasei Corp. Examples of hydrogenated products include SEPTON™, HYBRAR™ copolymers, manufactured by Kuraray Co., Ltd., TUFTEC™ copolymers, manufactured by Asahi Kasei Corp., DYNARON® copolymers, manufactured by JSRCorp., and G Series copolymers, manufactured by Kraton Polymers LLC. Specific examples of the styrene-based block copolymer include, but are not limited to, TUFTEC™ H1221, TUFTEC™ H1041, TUFTEC™ H1043, HYBRAR™ 7125F, HYBRAR™ 5125 and SEPTON™ 2104 copolymers.

According to another particular embodiment, the hydrocarbon thermoplastic is an aromatic hydrocarbon resin, in other words made uniquely from aromatic monomers. The aromatic monomer is, in a particular embodiment, α-methylstyrene. Thus, according to a particularly preferred embodiment, the aromatic hydrocarbon resin is chosen from the homopolymer and copolymer resins of α-methylstyrene having a softening point in the range between about 80° C. and about 170° C., preferably between about 90° C. and about 140° C. The softening point may be measured according to standard ISO 4625 ("Ring and Ball" method). Preferably, the hydrocarbon thermoplastic is an α-methylstyrene resin having a softening point in the range between about 95° C. and about 105° C. or between about 115° C. and about 125° C. or a poly(styrene-co-α-methylstyrene) resin having a softening point between about 95° C. and about 115° C. Such resins above are well known to a person skilled in the art and are commercially available, sold for example under the following tradenames: Sylvares™ SA 100 and Sylvares™ SA 120 from Arizona Chemical: α-methylstyrene resins having a softening point in the range between about 95° C. and about 105° C. or between about 115° C. and about 125° C., respectively, Cleartack® W90 or Norsolene® W90 resin from Cray Valley: poly(styrene-co-α-methylstyrene) resins having a softening point between about 85° C. and about 95° C., Kristalex 3100LV, Kristalex F100, Kristalex 3105SD and Kristalex F115 from Eastman: poly(styrene-co-α-methylstyrene) resins having a softening point of about 100° C., or between about 96° C. and about 104° C., or about 105° C., or between about 114° C. and about 120° C., respectively.

Further examples of hydrocarbon thermoplastics include, but are not limited to, rosins, rosin esters, disproportionated rosin esters, hydrogenated rosin esters, polymerized rosin esters, terpene resins, terpene-phenol resins, aromatic modified terpene resins, C5/C9 petroleum resins, hydrogenated petroleum resins, phenol resins, cumarone-indene resins and polydicyclopentadiene resins.

In one embodiment, the (b) resin may include the hydrocarbon thermoplastic in an amount within a range of 0% to about 100% by weight based on the total weight of the (b) resin. In another embodiment, the (b) resin may include the hydrocarbon thermoplastic in an amount within a range of about 10% to about 90% by weight or within a range of about 30% to about 70% by weight based on the total weight of the (b) resin.

According to another embodiment, the (b) resin includes a compound having the formula (3):

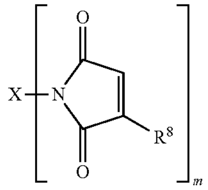
(3)

where X is an alkyl group, a substituted alkyl group, a cycloalkyl group, a substituted cycloalkyl group, an aryl group, a substituted aryl group, a polyaryl group, a substituted polyaryl group, a heteroaryl group, a substituted heteroaryl group, a polyheteroaryl group and a substituted polyheteroaryl group, $R^8$ is a hydrogen atom, a lower alkyl group or a substituted lower alkyl group and m is an integer from 1 to 10 and a mixture thereof.

In one embodiment, m is 1, $R^8$ is a hydrogen atom and X is $—R^{34}CH_2(alkyl)$, $—R^{34}NH_2R^{34}$, $—COCH_3$, $—CH_2OCH_3$, $—CH_2SOCH_3$, $—C_6H_5$, $—CH_2(C_6H_5)CH_3$, phenylene, diphenylene, a cycloalkyl group, a silane-substituted aryl group or a structure

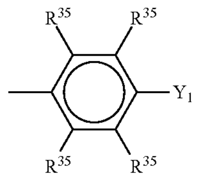

where $R^{35}$ is a hydrogen atom, —F, —Cl, —Br, $—HSO_3$, $—SO_2$ or an alkyl group having 1 to 6 carbon atoms and $Y_1$ is a hydrogen atom, $—R^{34}$, $—R^{34}CH_3$, $—C(CH_3)_3$, $—SOR^{34}$, $—CONH_2$ or $—C(CF_3)_3$ and $R^{34}$ is an alkyl group having 1 to 6 carbon atoms. Specific examples include, but are not limited to, maleimide-phenylmethane, phenyl-maleimide, methylphenyl maleimide, dimethylphenyl-maleimide, ethylenemaleimide, thiomaleimide, ketone-maleimide, methylene-maleinimide, maleinimidomethylether, maleimido-ethandiol, 4-phenylether-maleimide and 4-maleimido-phenylsulfone.

In another embodiment, m is 2, $R^8$ is hydrogen and X is $—R^{36}CH(alkyl)-$. $—R^{36}NH_2R^{36}—$, $—COCH_2—$, $—CH_2OCH_2—$, —CO—, —O—, —O—O—, —S—, —S—S—, —SO—, $—CH_2SOCH_2—$, —OSO—, $—C_6H_5—$, $—CH_2(C_6H_5)CH_2—$, $—CH_2(C_6H_5)(O)—$, -phenylene-, -diphenylene- or a structure

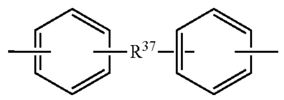

where $R^{37}$ is $—R^{36}CH_2—$, —CO—, $—C(CH_3)_2—$, —O—, —O—O—, —S—, —S—S—, —(O)S(O)— or —S(O)—, and $R^{36}$ is independently a hydrogen atom an alkyl group having 1 to 4 carbon atoms. For example, the bismaleimide may be N,N'-bismaleimide-4,4'-diphenylmethane, 1,1'-(methylenedi-4, 1-phenylene)bismaleimide, N,N'-(1,1'-biphenyl-4,4'-diyl) bismaleimide, N,N'-(4-methyl-1,3-phenylene) bismaleimide, 1,1'-(3,3'dimethyl-1,1'-biphenyl-4,4'-diyl)bismaleimide, N,N'-ethylenedimaleimide, N,N'-(1.2-phenylene)dimaleimide, N,N'-(1,3-phenylene) dimaleimide, N,N'-thiodimaleimide, N,N'-dithiodimaleimide, N,N'-ketonedimaleimide, N,N'-methylene-bis-maleinimide, bis-maleinimidomethyl-ether, 1,2-bis-(maleimido)-1,2-ethandiol N,N'-4,4'-diphenylether-bis-maleimide or 4,4'-bis(maleimido)-diphenylsulfone.

In another embodiment, m is greater than 2 and the compound of formula (3) can be prepared by the reaction of barbituric acid and a bismaleimide disclosed above. Barbituric acid may have the following structure

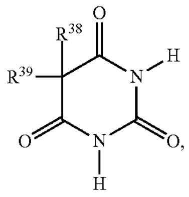

where $R^{38}$ and $R^{39}$ are independently a hydrogen atom, $CH_3$, $C_2H_5$, $C_6H_5$. $CH(CH_3)_2$, $CH_2CH(CH_3)_2$, $CH_2CH_2CH(CH_3)_2$ or

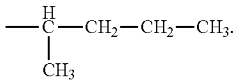

The bismaleimide oligomer is a multi-function bismaleimide oligomer with a hyper branch architecture or multi double-bond reactive functional groups. In the hyper branch architecture, the bismaleimide serves as an architecture matrix. The radical barbituric acid is grafted to the bismaleimide's double bond to begin branching and ordering to form the hyperbranch architecture. The multi-function bismaleimide oligomer is prepared by adjustment of for example, the concentration ratio, the chemical order addition procedure, the reaction temperature, the reaction time, the environmental condition, the branching degree, the polymerization degree, the structural configuration and the molecular weight. The branch architecture is $[(bismaleimide)-(barbituric\ acid)_z]_a$, where z is 0-4 or 0.5-2.5 and m (repeating unit) is less than 10.

In one embodiment, the (b) resin may include the compound having the formula (3) in an amount within a range of 0% to about 100% by weight based on the total weight of the (b) resin. In another embodiment, the (b) resin may include the compound having the formula (3) in an amount within a range of about 10% to about 90% by weight or within a range of about 30% to about 70% by weight based on the total weight of the (b) resin.

According to another embodiment, the resin composition may include the (b) resin in an amount of less than about 70% by weight or less than about 60% by weight or less than about 50% by weight, where the % by weight is based on the total weight of the resin composition. In another embodiment, the resin composition may include the (b) resin in an amount of at least about 5% by weight or at least about 10% by weight or at least about 15% by weight or at least about 20% by weight, where the % by weight is based on the total weight of the resin composition. In another embodiment, the resin composition may include the (b) resin in an amount within a range of 5%-40% by weight or within a range of about 7.5%-35% by weight or within a range of about 10%-30% by weight, where the % by weight is based on the total weight of the resin composition.

Although the resin composition of the present disclosure may be cured by mere heating, a curing catalyst that generates a cation or free radical species may be added in order to improve the curing efficiency. Examples of such curing catalysts include, but are not limited to, diallyliodonium salts, triallylsulfonium salts and aliphatic sulfonium salts, which contain $BF_4$, $PF_6$. $AsF_6$ or $SbF_6$ as a counter anion, benzoin type compounds such as benzoin and benzoin methyl, acetophenone type compounds such as acetophenone and 2,2-dimethoxy-2-phenylacetophenone and the like; thioxanthone type compounds such as thioxanthone and 2,4-diethylthioxanthone, bisazide compounds such as 4,4'-diazidochalcone, 2,6-bis(4-azidobenzal)cyclohexanone and 4,4'-diazidobenzophenone, azo compounds such as azobisisobutyronitrile, 2,2-azobispropane, m·m'-azoxy-styrene and hydrazone, organic peroxides such as 2,5-dimethyl-2,5-di(t-butylperoxy)hexane, 2,5-dimethyl-2,5-di(t-butylperoxy)hexyne-3 and dicumyl peroxide.

The resin composition may contain the curing catalyst in an amount of about 0.1%-10% by weight or about 0.3%-7% by weight or about 0.5%-5% by weight or about 1%-3% by weight, where the % by weight is based on the total weight of the resin composition.

In another embodiment, a polymerization inhibitor may optionally be added to the resin composition in order to enhance the storage stability. Examples include quinones and aromatic diols such as hydroquinone, p-benzoquinone, chloranil, trimethylquinone and 4-t-butylpyrocatechol. The resin composition may include from about 0.0005%-5% by weight of the polymerization inhibitor when present, where the % by weight is based on the total weight of the resin composition.

In another embodiment, the resin composition may optionally include an inorganic filler, organic filler or mixture thereof. Fillers contemplated for use in the practice of the present disclosure may be any of a variety of morphologies, e.g., angular, platelet, spherical, amorphous, sintered, fired, powder, flake, crystalline, ground, crushed, milled, and the like, or mixtures of any two or more thereof. Presently preferred particulate fillers contemplated for use herein are substantially spherical.

Such fillers may optionally be thermally conductive. Both powder and flake forms of filler may be used in the resin compositions of the present disclosure. Fillers having a wide range of particle sizes can also be employed in the practice of the present disclosure. Particle sizes ranging from about 500 nm up to about 300 microns may be employed, with particle sizes of less than about 100 microns being preferred, and particle sizes in the range of about 5 up to about 75 microns being particularly preferred.

A wide variety of fillers can be employed in the practice of the present disclosure, e.g., soft fillers (e.g., uncalcined talc), naturally occurring minerals (e.g., aluminum nitride, boron nitride, silicon carbide, diamond, graphite, beryllium oxide, magnesia, silica, alumina, aluminum silicates, and the like), calcined naturally occurring minerals (e.g., enstatite), synthetic fused minerals (e.g., cordierite), treated fillers (e.g. silane-treated minerals), organic polymers (e.g., polytetrafluoroethylene), hollow spheres, microspheres, powdered polymeric materials, and the like.

Exemplary fillers include talc, mica, calcium carbonate, calcium sulfate, aluminum nitride, boron nitride, silicon carbide, diamond, graphite, beryllium oxide, magnesia, silica, alumina, $TiO_2$, aluminum silicate, aluminum-zirconium-silicate, cordierite, silane-treated mineral, polytetrafluoroethylene, polyphenylene sulfide, and the like.

Thermally conductive fillers contemplated for optional use in the practice of the present disclosure include, for example, aluminum nitride, boron nitride, silicon carbide, diamond, graphite, beryllium oxide, magnesia, silica, alumina, zirconium silicate, and the like. Preferably, the particle size of these fillers will be about 20 microns. If aluminum nitride is used as a filler, it is preferred that it is passivated via an adherent, conformal coating (e.g., silica, or the like).

When fillers are present, the resin composition may contain up to about 75% by weight, or up to about 50% by weight, or up to about 25% by weight, or up to about 10% by weight of the filler, where the % by weight is based on the total weight of the resin composition.

In another embodiment, the resin composition may be dissolved or dispersed in an organic solvent to form a resin composition varnish. The amount of solvent is not limited, but typically is an amount sufficient to provide a concentration of solids in the solvent of at least 30% by weight to no more than 90% by weight solids, or between about 50%-85% by weight solids, or between about 55%-75% weight solids.

The organic solvent is not specifically limited and may be a ketone, an aromatic hydrocarbon, an ester, an amide or an alcohol. More specifically, examples of organic solvents which may be used include, acetone, methyl ethyl ketone, methyl isobutyl ketone, cyclohexanone, toluene, xylene, methoxyethyl acetate, ethoxyethyl acetate, butoxyethyl acetate, ethyl acetate, N-methylpyrrolidone formamide, N-methylformamide, N,N-dimethylacetamide, methanol, ethanol, ethylene glycol, ethylene glycol monomethyl ether, ethylene glycol monoethyl ether, diethylene glycol, triethylene glycol monomethyl ether, triethylene glycol monoethylether, triethylene glycol, propylene glycol monomethyl ether, dipropylene glycol monoethyl ether, propylene glycol monopropyl ether, dipropylene glycol monopropyl ether, and mixtures thereof.

The resin composition of the present disclosure may optionally include one or more additives such as flexibilizers, anti-oxidants, dyes, pigments, surfactants, defoamers, silane coupling agents, dispersing agents, thixotropic agents, processing aids, flow modifiers, cure accelerators, strength enhancers, toughening agents, UV protectors (especially UV blocking dyes appropriate to enable Automatic-Optical Inspection (AOI) of Circuitry), flame retardants and the like, as well as mixtures of any two or more thereof.

Flexibilizers (also called plasticizers) contemplated for use in certain embodiments of the present invention include compounds that reduce the brittleness of the formulation, such as, for example, branched polyalkanes or polysiloxanes that lower the glass transition temperature of the compositions. Such plasticizers include, for example, polyethers, polyesters, polythiols, polysulfides, polybutadienes such as those sold under the Poly BD® and RICON® brand names. Plasticizers, when employed, are typically present in the range of about 0.5% by weight up to about 30% by weight of the resin composition.

Anti-oxidants contemplated for use in the practice of the present invention include hindered phenols (e.g., BHT (butylated hydroxytoluene), BHA (butylated hydroxyanisole), TBHQ (tertiary-butyl hydroquinone), 2,2'-methylenebis(6-tertiarybutyl-p-cresol), and the like), hindered amines (e.g., diphenylamine, N,N'-bis(1,4-dimethylpentyl-p-phenylene diamine, N-(4-anilinophenyl)methacrylamide, 4,4'-bis($\alpha$,$\alpha$-dimethylbenzyl)diphenylamine, and the like), phosphites, and the like. When used, the quantity of anti-oxidant typically falls in the range of about 100 up to 2000 ppm, relative to the weight of the resin composition.

Dyes contemplated for use in certain embodiments of the present disclosure include nigrosine, Orasol blue GN, phthalocyanines, fluorescent dyes (e.g., Fluoral green gold dye, and the like), and the like. When used, organic dyes in relatively low amounts (i.e., amounts less than about 0.2% by weight) provide contrast.

Pigments contemplated for use in certain embodiments of the present disclosure include any particulate material added solely for the purpose of imparting color to the formulation, e.g., carbon black, metal oxides (e.g., $Fe_2O_3$, titanium oxide), and the like. When present, pigments are typically present in the range of about 0.5% by weight up to about 5% by weight, relative to the weight of the resin composition.

Toughening agents contemplated for use in the practice of the disclosure are materials which impart enhanced impact resistance to various articles. Exemplary toughening agents include synthetic rubber containing compounds such as Hypro, Hypox, and the like.

UV protectors contemplated for use in certain embodiments of the present invention include compounds which absorb incident ultraviolet (UV) radiation, thereby reducing the negative effects of such exposure on the resin or polymer system to which the protector has been added. Exemplary UV protectors include bis(1,2,2,6,6-pentamethyl-4-piperidinyl) sebacate, silicon, powdered metallic compounds, hindered amines (known in the art as "HALS"), and the like.

Defoamers contemplated for use in certain embodiments of the present invention include materials which inhibit formation of foam or bubbles when a liquid solution is agitated or sheared during processing. Exemplary defoamers contemplated for use herein include n-butyl alcohol, silicon-containing anti-foam agents, and the like.

Exemplary silane coupling agents contemplated for use in the practice of the present invention include materials which form a bridge between inorganic surfaces and reactive polymeric components, including materials such as epoxy silanes, amino silanes, and the like.

Exemplary thixotropic agents contemplated for use in the practice of the present invention include materials which cause liquids to have the property of enhanced flow when shear is applied, including materials such as high surface area fillers (e.g., fumed silica) having particle sizes in the range about 2-3 microns, or even submicron size.

The resin composition of the present disclosure may be prepared by appropriately mixing the above components and also kneading or mixing, as needed, by a kneading means such as a 3 rolls mill, a ball mill, a bead mill or a sand mill, or a stirring means such as a high-speed rotary mixer, a super mixer or a planetary mixer. Further, by adding the above-mentioned organic solvent, a resin composition varnish can also be prepared as described above.

In accordance with yet another embodiment of the present disclosure, there are provided articles comprising a partially or fully cured layer of the above-described resin composition on a substrate.

As readily recognized by those of skill in the art, a variety of substrates are suitable for use in the practice of the present disclosure, for example, polyesters, liquid crystalline polymers, polyamides (e.g., Aramids), polyimides, polyamide-imides, polyolefins, polyphenylene oxides, polyphenylene sulfides, polybenzoxazines, conductive materials (e.g., conductive metals), and the like, as well as combinations of any two or more thereof. When conductive metal substrates are employed, such materials as silver, nickel, gold, cobalt, copper, aluminum, alloys of such metals, and the like, are contemplated for use herein.

In accordance with still another embodiment of the present disclosure, there are provided methods of making the above-described articles (i.e., articles comprising the resin composition according to the present disclosure on a substrate), said methods comprising applying the resin composition to a substrate and, if an organic solvent is optionally employed to facilitate such application, removing substantially all organic solvent therefrom. The resin composition may be applied to the substrate by dipping, impregnating, spraying and the like.

In accordance with yet another embodiment of the present disclosure, there are provided prepregs produced by impregnating a porous substrate with a resin composition according to the present disclosure, and, if an organic solvent is optionally employed to facilitate such impregnation, subjecting the resulting impregnated substrate to conditions suitable to remove substantially all of the organic solvent therefrom.

As readily recognized by those of skill in the art, a variety of porous substrates can be employed for the preparation of inventive prepregs. The porous substrate may be woven or non-woven. The thickness of such substrate is not particularly limited, and may range, for example, from about 0.01 mm to 0.3 mm.

Examples of porous substrates can include, but are not limited to, woven glass, non-woven glass, woven aramid fibers, non-woven aramid fibers, woven liquid crystal polymer fibers, non-woven liquid crystal polymer fibers, woven synthetic polymer fibers, non-woven synthetic polymer fibers, randomly dispersed fiber reinforcements, expanded polytetrafluoroethylene (PTFE) structures and combinations of any two or more thereof. Specifically, materials contemplated for use as the porous substrate can include, but are not limited to, fiberglass, quartz, polyester fiber, polyamide fiber, polyphenylene sulfide fiber, polyetherimide fiber, cyclic olefin copolymer fiber, polyalkylene fiber, liquid crystalline polymer, poly(p-phenylene-2,6-benzobisoxazole), copolymers of polytetrafluoroethylene and perfluoromethylvinyl ether (MFA) and combinations of any two or more thereof.

In accordance with still another embodiment of the present disclosure, there are provided laminated sheets produced by layering and molding a prescribed number of sheets of the above-described prepreg.

Laminated sheets according to the present disclosure have many particularly beneficial properties, such as, for example, low dielectric constant, low dissipation factor, high thermal decomposition temperature, and the like. In a preferred embodiment, laminated sheets according to the present disclosure have a dielectric constant ≤3.0 nominal and a dissipation factor ≤0.002 at 10 GHz, and a glass transition temperature of at least 100° C. or at least 150° C.

In one aspect of the present disclosure, laminated sheets as described herein may optionally further comprise one or more conductive layers. Such optional conductive layers are selected from the group consisting of metal foils, metal plates, electrically conductive polymeric layers, and the like. In one embodiment, the metal may be copper, silver, nickel, gold, cobalt, aluminum and alloys of such metals.

In another embodiment, there is provided a method of forming a laminated sheet. The method includes contacting the porous substrate with a varnish bath comprising the resin composition of the present disclosure dissolved and intimately admixed in a solvent or a mixture of solvents. The contacting occurs under conditions such that the porous substrate is coated with the resin composition. Thereafter the coated porous substrate is passed through a heated zone at a temperature sufficient to cause the solvent to evaporate, but below the temperature at which the resin composition undergoes significant cure during the residence time in the heated zone to form a prepreg.

The porous substrate preferably has a residence time in the bath of from 1 second to 300 seconds, more preferably from 1 second to 120 seconds, and most preferably from 1 second to 30 seconds. The temperature of such bath is preferably from 0° C. to 100° C., more preferably from 10° C. to 40° C., and most preferably from 15° C. to 30° C. The residence time of the coated porous substrate in the heated zone is from 0.1 minute to 15 minutes, more preferably from 0.5 minute to 10 minutes, and most preferably from 1 minute to 5 minutes.

The temperature of such zone is sufficient to cause any solvents remaining to volatilize away yet not so high as to result in a complete curing of the components during the residence time. Preferable temperatures of such zone are from 80° C. to 250° C., more preferably from 100° C. to 225° C., and most preferably from 150° C. to 210° C. Preferably there is a means in the heated zone to remove the solvent, either by passing an inert gas through the oven, or drawing a slight vacuum on the oven. In many embodiments the coated substrate is exposed to zones of increasing temperature. The first zones are designed to cause the solvent to volatilize so it can be removed. The later zones are designed to result in partial cure of the resin composition (B-staging).

One or more sheets of prepreg are preferably processed into laminates optionally with one or more sheets of electrically-conductive material such as copper. In such further processing, one or more segments or parts of the coated porous substrate are brought in contact with one another and/or the conductive material. Thereafter, the contacted parts are exposed to elevated pressures and temperatures sufficient to cause the components to cure wherein the resin on adjacent parts react to form a continuous resin matrix between the porous substrates. Before being cured the parts may be cut and stacked or folded and stacked into a part of desired shape and thickness. The pressures used can be anywhere from 1 psi to 1000 psi with from 10 psi to 800 psi being preferred. The temperature used to cure the resin composition in the parts or laminates, depends upon the particular residence time, pressure used, and components used. Preferred temperatures which may be used are between 100° C. and 250° C., more preferably between 120° C. and 220° C., and most preferably between 170° C. and 200° C. The residence times are preferably from 10 minutes to 120 minutes and more preferably from 20 minutes to 90 minutes.

In one embodiment, the process is a continuous process where the porous substrate is taken from the oven and appropriately arranged into the desired shape and thickness and pressed at very high temperatures for short times. In particular such high temperatures are from 180° C. to 250° C., more preferably 190° C. to 210 C, at times of 1 minute to 10 minutes and from 2 minutes to 5 minutes. Such high speed pressing allows for the more efficient utilization of processing equipment. In such embodiments the preferred reinforcing material is a glass web or woven cloth.

In some embodiments it is desirable to subject the laminate or final product to a post cure outside of the press. This step is designed to complete the curing reaction. The post cure is usually performed at from 130° C. to 220° C. for a time period of from 20 minutes to 200 minutes. This post cure step may be performed in a vacuum to remove any components which may volatilize.

Thus, in accordance with yet another embodiment of the present disclosure, there are provided methods of making a laminated sheet, said method comprising layering and molding a prescribed number of sheets of a prepreg according to the present disclosure.

In accordance with a further embodiment of the present disclosure, there are provided printed wiring boards produced by forming conductive patterns on the surface of the above-described laminated sheet(s). Forming the conductive patterns may can be carried out by, for example, forming a resist pattern on the surface of the laminated sheet(s), removing unnecessary portions of the sheet by etching, removing the resist pattern, forming the required through holes by drilling, again forming the resist pattern, plating to connect the through holes, and finally removing the resist pattern.

In accordance with a still further embodiment of the present disclosure, there are provided multilayer printed wiring boards produced by layering and molding a prescribed number of sheets of the above-described patterned laminate layers, bonded together with one or more layers of prepreg from which the printed wiring board layer was prepared.

In accordance with a still further embodiment of the present invention, there are provided methods of making printed wiring boards, said methods comprising forming conductive patterns on the surface of a laminated sheet according to the present disclosure.

In accordance with yet another embodiment of the present disclosure, there are provided multilayer printed wiring boards produced by layering and molding a prescribed number of sheets of the above-described prepreg, to obtain a printed wiring board for an inner layer, and layering the prepreg on the printed wiring board for an inner layer which forms conductive patterns on the surface.

Accordingly, the prepreg and the printed wiring boards of the present disclosure may be usefully used as a component of a printed circuit board for a network for use in various electrical and electronic devices such as mobile communication devices that handle a high frequency signal of GHz or more, or the base station device thereof, and network-related electronic devices such as servers and routers, and large computers.

In some embodiments, the resin compositions of the present invention may have a dielectric dissipation factor (Df) that is flat over a wide frequency range, such that a component fabricated therefrom can operate efficiently at several different processing speeds. This is important because many state of the art electronic devices can operate over a range of frequencies and it is therefore desired that the electronic components maintain proper function throughout this frequency range. In another embodiment, the resin compositions of the present disclosure may have a dielectric constant (Dk) at 10 GHz of less than about 3 or less than about 2.9 or less than about 2.8 and a dissipation factor (Df) at 10 GHz of less than about 0.0025 or less than about 0.002.

The present disclosure will now be further described with reference to the following non-limiting examples.

EXAMPLES

Example 1 a) Preparation of Inventive and Comparative Resin Compositions

The components identified in Table 1 were dissolved at room temperature in toluene at a concentration of 50% by weight.

TABLE 1

| Component | Ex. 1 (pbw) | Ex. 2 (pbw) | Ex. 3 (pbw) | Ex. 4 (pbs) | Ex. 5 (pbw) | Ex. 6 (pbw) | Ex. 7 (pbw) | Ex. 8 (pbw) | Comp. Ex. (pbw) |
|---|---|---|---|---|---|---|---|---|---|
| Vinylbenzyl indene[a] | 50 | 50 | 50 | 50 | 50 | 50 | 50 | 50 | |
| Vinylbenzyl fluorene[b] | 30 | 30 | 30 | 30 | | | | 20 | |
| Hydrocarbon Thermoplastic[c] | 20 | | | | 20 | | | | |
| Hydrocabon Thermoplastic[d] | | 20 | | | | 20 | | | |
| Bismaleimide (BMI3000) | | | 20 | 20 | | | 20 | | |
| Dicumyl peroxide | 1 | 1 | 1 | 0.5 | 1 | 1 | 1 | 1 | 1 |
| Polypheneylene ether derivative[e] | | | | | 30 | 30 | 30 | 30 | |
| Polypheneylene ether derivative[f] | | | | | | | | | 70 |
| Triallyl isocyanurate | | | | | | | | | 30 |

[a]A mixture of 1,1,2-(various isomers of 2-,3- and 4-vinylbenzyl)-1H-indene (83%) and 1,1-(various isomers of 2-,3- and 4-vinylbenzyl)-1H-indene (17%)
[b]9,9-bis-(o,m,p-vinylbenzyl)-9H-fluorene
[c]Polystyrene-Poly(alpha)styrene block copolymer
[d]Vinyl-bond rich SIS (Styrene-isoprene-styrene) triblock-copolymer
[e]OPE 2200 resin (Mitsubishi Gas Chemical)
[f]SA9000 resin (Sabic)

The homogenous resin compositions were then casted on a metal plate and toluene was evaporated over night at ambient conditions. The pre-dried resin film was placed in an oven and cured stepwise under nitrogen using following cure cycle: 1 hour at 70° C., 1 hour at 90° C., 1 hour at 140° C. and 2 hours 200° C. The resulting plates with an approximate thickness of 0.5 mm were evaluated for the dielectric constant (Dk) and the dissipation factor (Df) on a Split Post Dielectric Resonator (SPDR) at a frequency of 10 Ghz and the results are shown below in Table 2.

TABLE 2

| Property | Ex. 1 | Ex. 2 | Ex. 3 | Ex. 4 | Ex. 5 | Ex. 6 | Ex. 7 | Ex. 8 | Comp. Ex |
|---|---|---|---|---|---|---|---|---|---|
| Dk/Df (10 GHz) | 2.66/ 0.00107 | 2.58/ 0.00104 | 2.60/ 0.00114 | 2.55/ 0.00089 | 2.66/ 0.00151 | 2.59/ 0.00150 | 2.61/ 0.00195 | 2.62/ 0.00184 | 2.63/ 0.00268 |
| Dk/Df (10 GHz) after 7 days at 85° C./85% Rel. Humidity | 2.65/ 0.00205 | 2.60/ 0.00257 | 2.63/ 0.00256 | 2.56/ 0.00207 | 2.71/ 0.00242 | 2.62/ 0.00284 | 2.51/ 0.00263 | 2.67/ 0.00342 | 2.71/ 0.00683 |

b) Preparation of Prepregs According to the Present Disclosure

After all components identified in Table 1 were dissolved at room temperature in toluene, silica filler was added to produce a homogenous resin composition varnish with a concentration of 50-60% by weight solids. Glass fabric (E2116NE glass) was immersed into the varnish, then placed vertical in an oven and dried for 3 minutes at 150° C. to produce sheets of prepreg.

c) Preparation of Laminates According to the Present Disclosure

The sheets of prepreg above were press cured for 2 hours at 220° C. with a resin content of about 45% by weight to about 50% by weight in the final laminate.

Although making and using various embodiments of the present invention have been described in detail above, it should be appreciated that the present invention provides many applicable inventive concepts that can be embodied in a wide variety of specific contexts. The specific embodiments discussed herein are merely illustrative of specific ways to make and use the invention, and do not delimit the scope of the invention.

Example 2: Measurements of the Glass Transition Temperature of the Prepregs Obtained Respectively with Two Compositions According to the Invention and with a Comparative Composition a) Comparative Example

The comparative compound 2 exemplified in Synthesis Example 1 of JP2003283076 was synthesized following the proceeding described in Synthesis Example 1 of JP2003283076 as follows:

249 g (1.5 mol) of fluorene, 250 g of toluene and 22 g (0.069 mol) of tetra-n-butylammonium bromide were put in a flask equipped with a temperature controller, an agitator, a cooling condenser, a dropping funnel, and an oxygen inlet.

To this flask was added 76 g (1.0 mol) of allyl chloride, 335 g (purity 91%, 2.0 mol) of vinyl benzyl chloride CMS-AM (m/p isomer: 50/50 wt % mixture) and the temperature of the mixture was raised to 40° C. with stirring.

To this stirred mixture was added 240 g (NaOH, 6 mol) of a 50 wt % NaOH aqueous solution, and the mixture was then reacted at 60° C. for 8 hours. Next, the mixture in the flask were neutralized with 2N hydrochloric acid, washed twice with distilled water, the toluene was distilled off under reduced pressure, and the obtained orange viscous liquid was vacuum-dried to give the comparative compound 2 being a fluorene compound substituted both with a vinylbenzyl group and with an allyl group.

b) Production of a Prepreg (IP1) with the Comparative Compound 2

90 parts of the comparative compound 2 was then mixed with 10 parts phenyl maleimide in chloroform and a prepreg (IP1) was produced, using 2116NE glass from Nittobo Japan, by drying 5 minutes at 150° C. followed by curing with pressure under a temperature ramp from 30° C. to 220° C. at 3° C./min and then isothermally cured for 2 hrs.

c) Production of a Prepreg (IP2) with the Compound According to the Invention Being 9,9-bis-(o,m,p-vinylbenzyl)-9H-fluorene 90 parts of 9,9-bis-(o,m,p-vinylbenzyl)-9H-fluorene was then mixed with 10 parts phenyl maleimide in chloroform and a prepreg (IP2) was produced, using 2116NE glass from Nittobo Japan, by drying 5 minutes at 150° C. followed by curing with pressure under a temperature ramp from 30° C. to 220° C. at 3° C./min and then isothermally cured for 2 hrs.

d) Production of a Prepreg (IP3) with the Compound According to the Invention Being 9,9-bis-(o,m,p-vinylbenzyl)-9H-fluorene 103 parts of 9,9-bis-(o,m,p-vinylbenzyl)-9H-fluorene was then mixed with 10 parts phenyl maleimide in chloroform and a prepreg (IP3) was produced, using 2116NE glass from Nittobo Japan, by drying 5 minutes at 150° C. followed by curing with pressure under a temperature ramp from 30° C. to 220° C. at 3° C./min and then isothermally cured for 2 hrs.

Glass transition temperature was measured by G' onset in a DHR-3 rheometer from TA instruments in torsion mode. Temperature was increased from 23° C. to 300° C. at a rate of 5° C. per minute at a strain of 0.08% at 1 Hz frequency.

G' onset values for the prepregs IP1, IP2 and IP3 were measured and the results are shown below in Table 3:

| Prepreg | G' (° C.) |
|---|---|
| IP1 | 212 |
| IP2 | 287 |
| IP3 | >300 |

The results shown in Table 3 demonstrate that IP1 obtained with the comparative compound 2 according to JP2003283076 comprising a fluorene compound substituted both with a vinylbenzyl group and with an allyl group has significantly lower glass transition than the prepregs obtained with the compositions according to the invention (IP2 and IP3).

The invention claimed is:

1. A resin composition including:

(a) a crosslinker selected from:

(i) a vinylbenzyl indene having a formula (1)

(1)

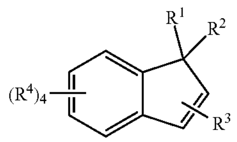

where $R^1$, $R^2$ and $R^3$ are each independently selected from a vinylbenzyl group, a hydrogen atom, a lower alkyl group, a thioalkoxy group having 1 to 5 carbon atoms, and an aryl group provided that at least one of $R^1$, $R^2$, and $R^3$ is a vinylbenzyl group; and $R^4$ is selected from a hydrogen atom, a halogen atom, a lower alkyl group, an alkoxy group having 1 to 5 carbon atoms, a thioalkoxy group having 1 to 5 carbon atoms, a thioaryloxy group, and an aryl group;

(ii) a vinylbenzyl fluorene having the formula (2)

(2)

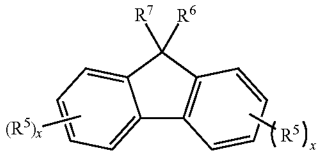

where each $R^5$ is independently selected from a hydrogen atom, a halogen atom, a lower alkyl group, an alkoxy group having 1 to 5 carbon atoms, a thioalkoxy group having 1 to 5 carbon atoms, and an aryl group, x is an integer of 0 to 4; and $R^6$ and $R^7$ are independently selected from a vinylbenzyl group, a hydrogen atom, a lower alkyl group, a thioalkoxy group having 1 to 5 carbon atoms, and an aryl group provided that at least one of $R^6$ and $R^7$ is a vinylbenzyl group; and, (iii) a mixture thereof; and (b) a resin selected from:

(i) a polyphenylene ether derivative;

(ii) a hydrocarbon thermoplastic is selected from (A) styrene-isoprene-styrene block copolymers, poly(styrene-butadiene-styrene) block copolymers, styrene-ethylene-butylene-styrene block copolymers, styrene-ethylene/propylene-styrene block copolymers, and a mixture thereof or (B) a poly(styrene-co-α-methylstyrene) resin, a rosin, a rosin ester, a disproportionated rosin ester, a hydrogenated rosin ester, a polymerized rosin ester, a terpene resin, a terpene-phenol resin, an aromatic modified terpene resin, a C5/C9 petroleum resin, a hydrogenated petroleum resin, a phenol resins, a cumarone-indene resin a polydicyclopentadiene resin and a mixture thereof;

(iii) a compound having the formula (3)

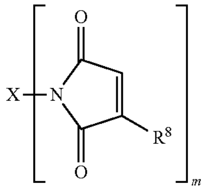

(3)

where X is an alkyl group, a substituted alkyl group, a cycloalkyl group, a substituted cycloalkyl group, an aryl group, a substituted aryl group, a polyaryl group, a substituted polyaryl group, a heteroaryl group, a substituted heteroaryl group, a polyheteroaryl group and a substituted polyheteroaryl group, $R^8$ is hydrogen, a lower alkyl group or a substituted lower alkyl group and m is an integer from 1 to 10; and (iv) a mixture thereof.

2. The resin composition of claim 1, wherein the polyphenylene ether derivative comprises a compound having the formula (4) or formula (5)

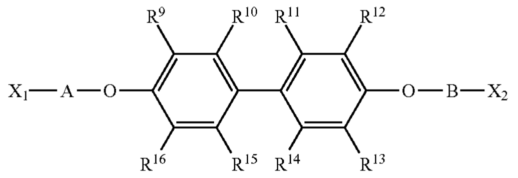

(4)

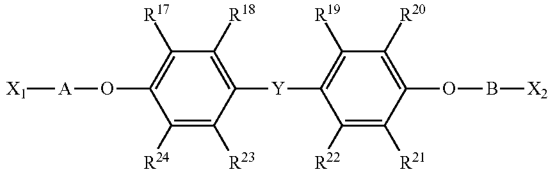

(5)

where $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$ and $R^{24}$ are each independently a hydrogen atom, an alkyl group, an alkenyl group, an alkynyl group, a formyl group, an alkylcarbonyl group, an alkenylcarbonyl group or an alkynylcarbonyl group, A and B are structures represented by the formula (6) and formula (7):

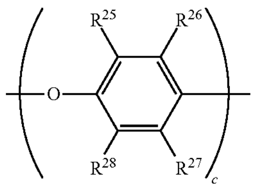

(6)

-continued

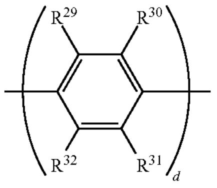

(7)

where $R^{25}$, $R^{26}$, $R^{27}$, $R^{28}$, $R^{29}$, $R^{30}$, $R^{31}$ and $R^{32}$ are each independently a hydrogen atom or an alkyl group and c and d are each an integer from 1 to 50 or from 1 to 20, Y is a hydrogen atom or alkyl group, and $X_1$ and $X_2$ are each independently a vinylbenzyl group or a structure represented by the following formula (8)

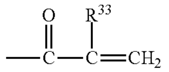

(8)

where $R^{33}$ is a hydrogen atom or an alkyl group.

3. The resin composition of claim 1, wherein the compound of formula (3) is a compound in which m is 2, $R^8$ is hydrogen and X is $-R^{36}CH$ (alkyl)-, $-R^{36}NH_2R^{36}$, $-COCH_2-$, $-CH_2OCH_2-$, $-CO-$, $-O-$, $-O-O-$, $-S-$, $-S-S-$, $-SO-$, $-CH_2SOCH_2-$, $-OSO-$, $-C_6H_5-$, $-CH_2(C_6H_5)CH_2-$, $-CH_2(C_6H_5)(O)-$, -phenylene-, -diphenylene- or a structure

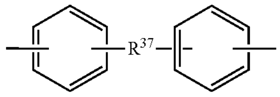

where $R^{37}$ is $-R^{36}CH_2-$, $-CO-$, $-C(CH_3)_2-$, $-O-$, $-O-O-$, $-S-$, $-S-S-$, $-(O)S(O)-$ or $-S(O)-$, and $R^{36}$ is independently a hydrogen atom an alkyl group having 1 to 4 carbon atoms.

4. The resin composition of claim 1, wherein the vinylbenzyl fluorene is selected from 9,9-bis-(o-vinylbenzyl)-9H-fluorene, 9,9-bis-(m-vinylbenzyl)-9H-fluorene, 9,9-bis-(p-vinylbenzyl)-9H-fluorene and a mixture thereof.

5. The resin composition of claim 1, wherein the vinylbenzyl indene is selected from 1,3-(2-vinylbenzyl)-1H-indene, 1,1,2-(3-vinylbenzyl)-1H-indene, 1,1,2-(4-vinylbenzyl)-1H-indene, 1,1-(2-vinylbenzyl)-1H-indene, 1,1-(3-vinylbenzyl)-1H-indene, 1,1-(4-vinylbenzyl)-1H-indene, 1,3-(2-vinylbenzyl)-1H-indene; 1,3-(3-vinylbenzyl)-1H-indene; 1,3-(4-vinylbenzyl)-1H-indene; 1-(2-vinylbenzyl)-1H-indene; 1-(3-vinylbenzyl)-1H-indene; 1-(4-vinylbenzyl)-1H-indene; 3-(2-vinylbenzyl)-1H-indene; 3-(3-vinylbenzyl)-1H-indene; 3-(4-vinylbenzyl)-1H-indene and a mixture thereof.

6. The resin composition of claim 1, wherein the (a) crosslinker comprises (i) at least about 50% by weight of one or more of 1,1,3-(2-vinylbenzyl)-1H-indene, 1,1,2-(3-vinylbenzyl)-1H-indene, 1,1,2-(4-vinylbenzyl)-1H-indene and less than about 50% by weight of one or more of 1,1-(2-vinylbenzyl)-1H-indene, 1,1-(3-vinylbenzyl)-1H-indene, 1,1-(4-vinylbenzyl)-1H-indene, 1,3-(2-vinylbenzyl)-1H-indene; 1,3-(3-vinylbenzyl)-1H-indene; 1,3-(4-vinylbenzyl)-

1H-indene and optionally less than about 5% by weight of one or more of 1-(2-vinylbenzyl)-1H-indene; 1-(3-vinylbenzyl)-1H-indene; 1-(4-vinylbenzyl)-1H-indene; 3-(2-vinylbenzyl)-1H-indene; 3-(3-vinylbenzyl)-1H-indene; 3-(4-vinylbenzyl)-1H-indene where the % by weight is based on the total weight of the (i) component.

7. The resin composition of claim 1, further comprising a curing catalyst.

8. The resin composition of claim 1, further comprising a filler.

9. An article comprising a partially or fully cured layer of the resin composition of claim 1 on a substrate.

10. The article of claim 9 wherein the substrate is a woven or non-woven organic or inorganic substrate.

11. The article of claim 10 wherein the inorganic substrate is woven glass, non-woven glass, woven aramid fibers, non-woven aramid fibers, woven liquid crystal polymer fibers, non-woven liquid crystal polymer fibers, woven synthetic polymer fibers, non-woven synthetic polymer fibers, randomly dispersed fiber reinforcements, expanded polytetrafluoroethylene (PTFE) structures, a conductive material or combinations of any two or more thereof.

12. The article of claim 11 wherein the conductive material is silver, nickel, gold, cobalt, copper, aluminum, or an alloy of silver, nickel, gold, cobalt, copper or aluminum.

13. A prepreg comprising a porous substrate impregnated with the resin composition of claim 1.

14. A laminate comprising the prepreg of claim 13 and a layer of an electrically conductive material disposed on at least one surface of the prepreg.

15. A printed wiring board produced by forming a conductive pattern on the surface of the laminated sheet of claim 14.

* * * * *